April 12, 1966 E. A. TESSIN II 3,245,183
MODULAR HOUSE HAVING DIVIDING COMPONENT WALLS DIMENSIONED
IN CORRELATION WITH THE MODULAR DIMENSION
Filed June 27, 1962 13 Sheets-Sheet 1

FIG. I

INVENTOR.
EMIL A. TESSIN II
BY
ATTORNEY

FIG. 2

INVENTOR.
EMIL A. TESSIN II
BY
ATTORNEY

April 12, 1966  E. A. TESSIN II  3,245,183
MODULAR HOUSE HAVING DIVIDING COMPONENT WALLS DIMENSIONED
IN CORRELATION WITH THE MODULAR DIMENSION
Filed June 27, 1962  13 Sheets-Sheet 3

FIG. 3

INVENTOR.
EMIL A. TESSIN II
BY
ATTORNEY

April 12, 1966 E. A. TESSIN II 3,245,183
MODULAR HOUSE HAVING DIVIDING COMPONENT WALLS DIMENSIONED
IN CORRELATION WITH THE MODULAR DIMENSION
Filed June 27, 1962 13 Sheets-Sheet 4

INVENTOR.
EMIL A. TESSIN II
BY
*J. William Freeman*
ATTORNEY

April 12, 1966 E. A. TESSIN II 3,245,183
MODULAR HOUSE HAVING DIVIDING COMPONENT WALLS DIMENSIONED
IN CORRELATION WITH THE MODULAR DIMENSION
Filed June 27, 1962 13 Sheets-Sheet 5

INVENTOR.
EMIL A. TESSIN II
BY
ATTORNEY

April 12, 1966 E. A. TESSIN II 3,245,183
MODULAR HOUSE HAVING DIVIDING COMPONENT WALLS DIMENSIONED
IN CORRELATION WITH THE MODULAR DIMENSION
Filed June 27, 1962 13 Sheets-Sheet 10

FIG. 19

INVENTOR.
EMIL A. TESSIN II
BY
ATTORNEY

April 12, 1966  E. A. TESSIN II  3,245,183
MODULAR HOUSE HAVING DIVIDING COMPONENT WALLS DIMENSIONED
IN CORRELATION WITH THE MODULAR DIMENSION
Filed June 27, 1962  13 Sheets-Sheet 11

FIG. 20

INVENTOR.
EMIL A. TESSIN II
BY
ATTORNEY

April 12, 1966 E. A. TESSIN II 3,245,183
MODULAR HOUSE HAVING DIVIDING COMPONENT WALLS DIMENSIONED
IN CORRELATION WITH THE MODULAR DIMENSION
Filed June 27, 1962 13 Sheets-Sheet 12

FIG. 21

INVENTOR.
EMIL A. TESSIN II
BY
ATTORNEY

April 12, 1966 E. A. TESSIN II 3,245,183
MODULAR HOUSE HAVING DIVIDING COMPONENT WALLS DIMENSIONED
IN CORRELATION WITH THE MODULAR DIMENSION
Filed June 27, 1962 13 Sheets-Sheet 13

FIG. 22

INVENTOR.
EMIL A. TESSIN II
BY
ATTORNEY

United States Patent Office 3,245,183
Patented Apr. 12, 1966

3,245,183
MODULAR HOUSE HAVING DIVIDING COMPONENT WALLS DIMENSIONED IN CORRELATION WITH THE MODULAR DIMENSION
Emil A. Tessin II, Cuyahoga Falls, Ohio, assignor, by mesne assignments, to Alside, Inc., a corporation of Ohio
Filed June 27, 1962, Ser. No. 205,779
9 Claims. (Cl. 52—243)

This invention relates to the art of prefabricated housing and in particular to that type of prefabricated home wherein a given number of building modules of identical dimension are employed for the purpose of creating living space designed to meet the living requirements of the user.

In the past, the modular concept has enjoyed a certain acceptance in the field of prefabricated housing because of the fact that the use of identical building modules facilitates mass production of the component parts that are employed in such housing.

For example, a floor to ceiling height of eight feet has become almost universally standard as the height dimension of any building module so employed. It will be seen that by the use of a module having an eight foot height dimension that wall components for example can be readily produced on a mass production basis by merely having the width dimensions of such panel correspond to one of the two planar dimensions of the module that has been selected.

It has been discovered that the maximum living space can be achieved with minimal expense by utilizing identical modules that have a height dimension of eight feet and planar dimensions of twelve feet by fourteen feet.

It has further been discovered that a greater discipline of dimension can be achieved with the aforementioned modules if the individual modules are spaced from each other by four inches at their areas of adjacency with each other, with such spacing of the adjacent faces of the modules from each other serving to provide increased dimensional stability while simultaneously increasing the overall living area beyond that which would be attained in the event such spacing was not employed.

In this regard, the desired spacing above described is achieved by utilizing a structural framework that preferably has a four inch cross sectional dimension in the area of connection with wall members, with the four inch surface of this framework serving to support four inch wall components in overlying relationship to the edge portion thereof with the supporting four inch faces of such framework being spaced exactly 8'0", 12'0" or 14'0" from each other to thus define the 8'0" x 12'0" x 14'0" module.

It has been also discovered in connection with the concept above disclosed that the overall living space can be more efficiently divided into room area by utilizing prefabricated component walls that serve the dual function of dividing the overall area into rooms, while providing storage or other useable space in the appropriate area.

Because of the structural framework above described, these component walls will not have to be load bearing in nature and thus are preferably made within the nominal tolerance of the module height dimension (eight feet) so as to facilitate sliding of the same into place for the purpose of dividing the living area into separate room areas.

In connection with the use of component walls of the type above described, it has been further discovered that if the width dimension of the component walls is correlated with respect to the planar dimensions of the building module employed, that then and in that event a maximum number of component combinations can be achieved for the purpose of providing flexibility in design of the dividing walls while still only requiring a minimal number of widths to achieve this maximum number of wall combinations.

Specifically, and in the use of a building module having planar dimensions of twelve feet by fourteen feet, it has been found that the use of the component walls having widths of either 28 inches, 44 inches or 56 inches will provide a maximum number of wall combinations that can be used to provide various types of dividing walls with it being noted that such design flexibility is achieved with three basic widths. Preferably a depth dimension of 28 inches will be uniformly employed because of the fact that the same provides the normal 2'0" depth requirement plus a 4 inch space for utility connections.

While correlation between the planar dimensions of the building module and the width dimensions of component walls is important for the reasons aforesaid, it should also be noted that the use of planar dimensions of twelve feet by fourteen feet spaced from each other by four inches at points of adjacency also permits maximum production advantages to be obtained with a minimal amount of exterior wall widths.

Specifically, it has been found that the use of the twelve and fourteen feet modular planar dimensions, when combined with the four inch spacing above noted, permits a complete perimeter wall to be erected by merely making wall sections in widths of two feet, six feet, twelve feet and fourteen feet. In this regard, the prefabricated house that illustrated the concept of this invention utilizes a combination of glass and solid exterior panels with the glass walls having width dimensions that are normally either three, six or twelve feet, while the solid wall panels have width dimensions selected basically from the dimensions of two feet, six feet, twelve feet and fourteen feet, although it is obvious that a solid panel can be cut down in size to meet any dimensional requirement of width.

By use of the above dimensional correlation between basic module size, module spacing and component widths, there is produced a prefabricated house whose aesthetic appearance is enhanced by the blending of solid and glass panels that form the exterior walls of the house. It will also be noted that the arrangement in question, wherein the panels are positioned within a vertical frame of eight feet in height and either twelve or fourteen feet in width permits the ultimate in design flexibility to meet site requirements.

Thus, any combination of glass and solid panels can be employed, in any vertical wall opening and further, and as will be brought out in the ensuing specification, the panel components (referring to both solid and glass panels) can be rearranged in the event that the occupant so desires. Additionally, use of the detachable exterior panels in a vertical framework permits readily expansion of the dwelling with minimal effort.

As a still further advantage of the module principle above described, it is noted that the same lends itself to being utilized readily with prefabricated utility components.

For example, in preparing the site, the plumbing connections can be provided to a point just below the normal floor level whereupon a prepackaged and predimensioned plumbing package can be quickly attached with minimal effort. Similarly, the component walls can be provided with electrical connections so as to facilitate rapid attachment between these components and a central prepackaged and predesigned source of electrical power. Heating and air conditioning units can be designed to be similarly readily attached.

It accordingly becomes the principal object of this invention to provide prefabricated houses that feature the use of a structural framework that encloses and prespaces a plurality of adjacent building modules to define an overall living area that may be divided into room areas by the use of component walls whose dimensions are correlated to the dimensions of the building module employed.

Other objects of the invention will become more apparent upon a reading of the following brief specification, considered and interpreted in the light of the accompanying drawings.

Of the drawings:

FIGURES 6, 7, 8 and 9 are elevational views of the house shown in FIGURE 1 with FIGURES 6 and 9 being rear and front elevations respectively, while FIGURES 7 and 8 are left and right side elevation views taken with respect to FIGURE 1.

Figure 1:
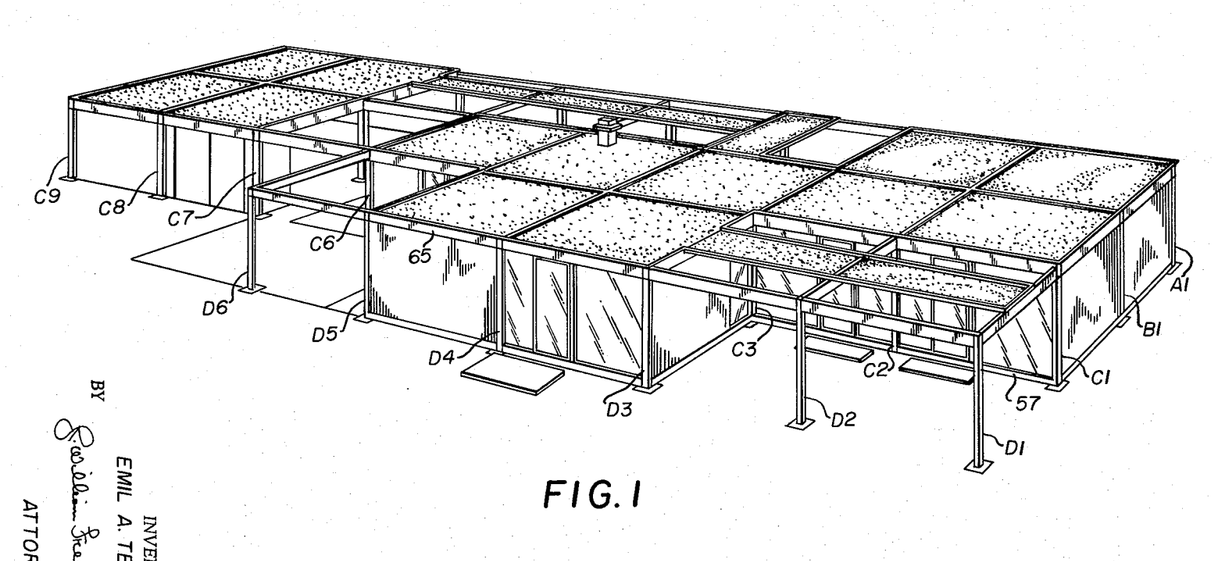
FIGURE 1 is a perspective view of a house erected in accordance with the modular principle of this invention.
Figure 2:
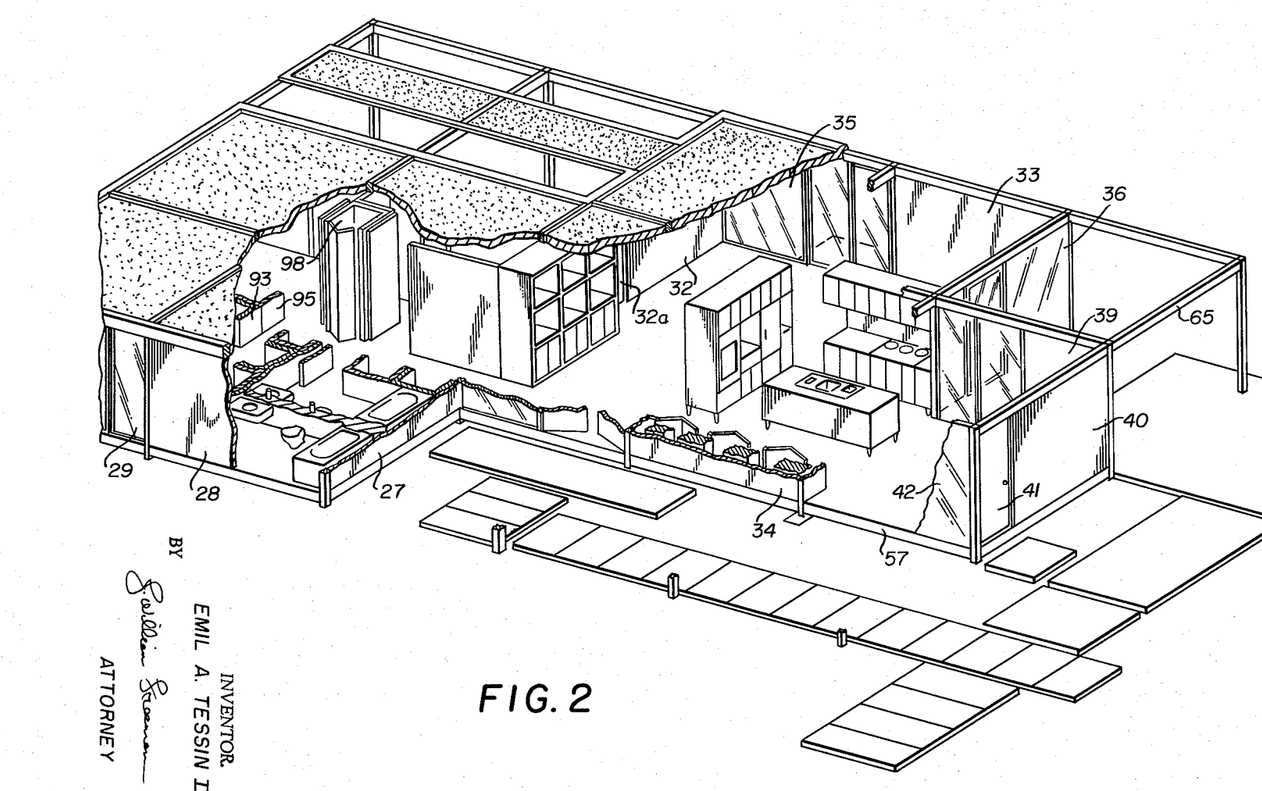
FIGURE 2 is a similar perspective view broken-away in section and showing certain details with respect to the ceilings, floors, exterior walls and component walls of the house of FIGURE 1.
Figure 3:
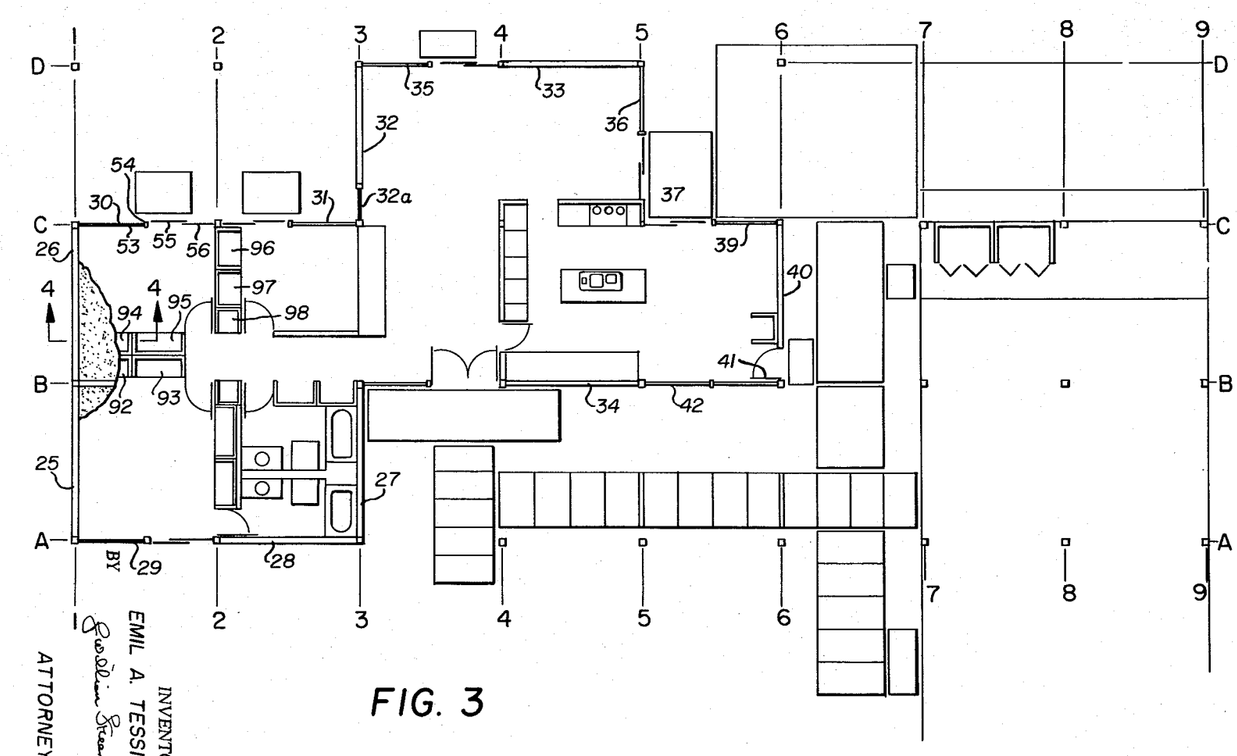
FIGURE 3 is a plan view of the house of FIGURE 1 with a majority of the roof section being removed to show the detailed room arrangement of such house with location lines being superimposed for column identification purposes.

Referring now to the drawings and in particular to FIGURES 1 through 9 thereof, the overall arrangement of the house can best be understood by reference to FIGURES 1 and 3 wherein the overall modular concept will be more evident.

Referring first to FIGURE 3, it will be first noted that FIGURE 3 is substantially to scale and has been marked with horizontal guide lines A, B, C, and D as well as vertical guide lines 1, 2, 3, 4, 5, 6, 7, 8 and 9. This has has been done for the purpose of permitting easier identification of the column locations that form the supporting structure for the building module of eight feet by twelve feet by fourteen feet.

Figure 4:
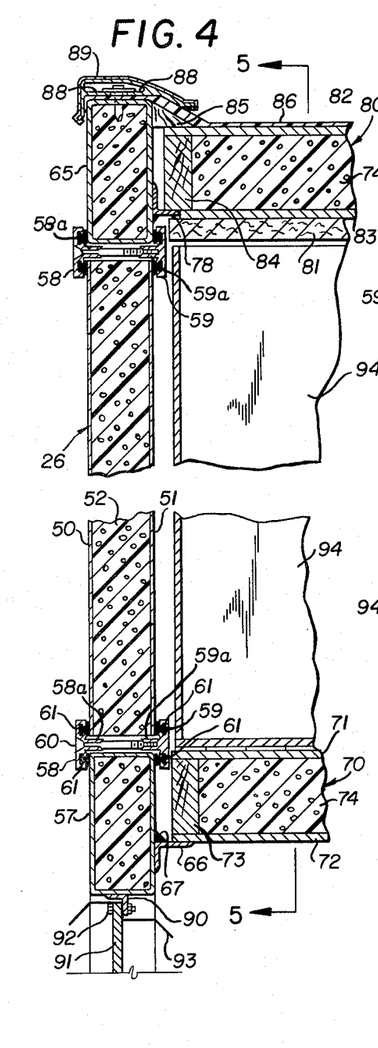
FIGURE 4 is a sectional view taken on the lines 4—4 of FIGURE 3 and showing the connection of structural parts from foundation to roof.

Accordingly, and referring to FIGURE 3, it will be noted that the columns located on the lines A, B, C and D have their opposed faces spaced exactly fourteen feet apart, while the opposed faces of columns located on the lines 1–9 have their faces spaced exactly 12′0″ apart. The columns are, of course, connected as shown in FIGURE 4 by floor and ceiling beams with the spacing between the opposed faces of the floor and ceiling beams being exactly 8′0″.

Thus, it will be seen that the bedroom and bath area of the modular home shown in FIGURE 3 is bounded on the four sides thereof by columns A1, A3, C1 and C3. The exterior walls in this area include solid walls 25 and 26, each of 14′0″ width and respectively connecting the beam B1 with the beams A1 and C1. A solid panel 27 of 14′0″ width similarly connects columns A3 and B3 as shown in FIGURE 3, while a 12′0″ width panel 28 connects columns A2 and A3. Glass units 29, 30 and 31 each of 12′0″ width are shown respectively interconnecting (1) columns A1 and A2; (2) columns C1 and C2; and (3) columns C2 and C3.

The living, dining, entry and kitchen area is defined by similar units including solid panels 32, 33 and 34 as well as glass panels 35, 36 and 37 with it being noted that the twelve foot glass panel 36 connects to a two foot solid panel 37 to span the fourteen foot dimension between columns C5 and D5. While panel 32 has been described as solid, it will be noted that the same is made up of a solid panel trimmed to 11′0″ width together with a 3′0″ fixed glass panel 32a.

The family room area is enclosed by a glass panel 39, a solid panel 40 that includes a door section 41, and a fixed glass panel 42. The construction of the solid panels is identical in each situation with only the width thereof being varied for use in spanning either the twelve or fourteen foot dimension between adjoining column faces.

Accordingly and referring to FIGURE 4, it will be noted that the exterior panel 26 which is typical of all solid exterior panels includes thin sheets of aluminum 50 and 51 that are secured to the opposed faces of a polystyrene foam core member 52 so as to provide a rigid panel unit that has excellent insulating properties.

It is to be understood that all panels indicated as being solid are constructed in like fashion and preferably have a thickness dimension of exactly four inches so as to be flush with the faces of the upright columns which are preferably four inches square in cross section.

With reference to the glass panels reference is made to the unit indicated by the numeral 30 in FIGURE 3 of the drawings. Specifically, the unit 30 includes a fixed sash unit 53 that has a frame element 54 that is secured with respect to the modular opening on three sides. Sliding door panels 55 and 56 are received in the other half of the unit 30 and operate in known fashion to permit ingress and egress upon opening thereof.

Figure 5:
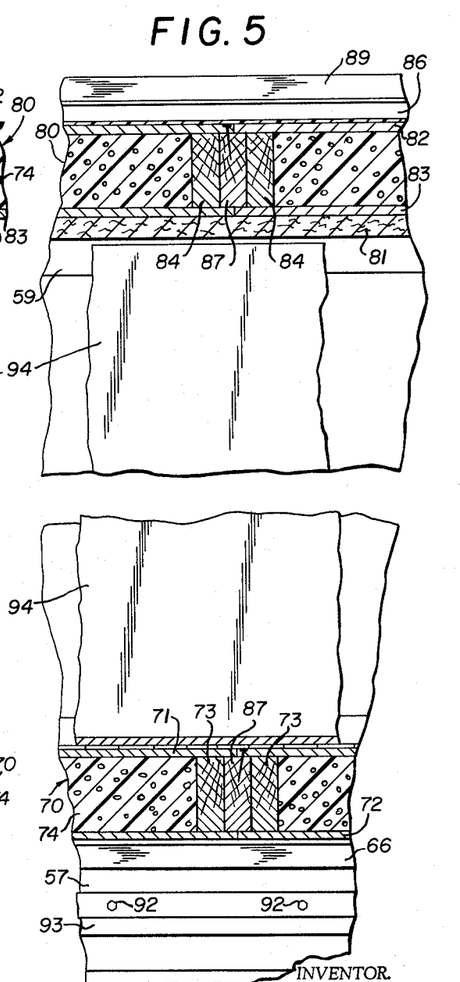
FIGURE 5 is a vertical section taken on the lines 5—5 of FIGURE 4 and illustrating in section the roof, closet, floor and beam elements.
Figure 6:
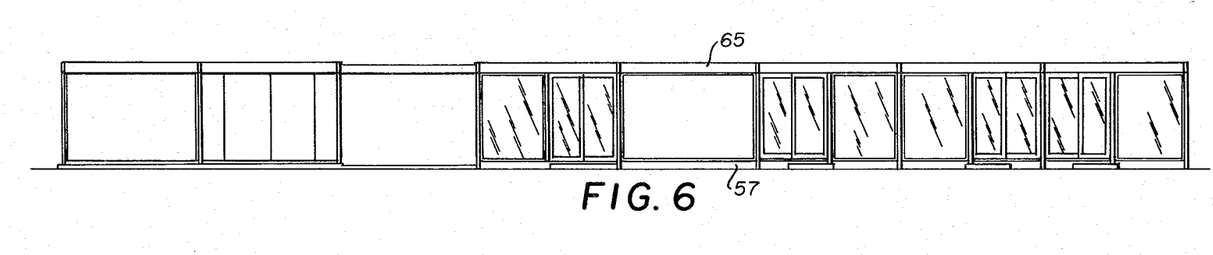
Figures 7, 8, 9:
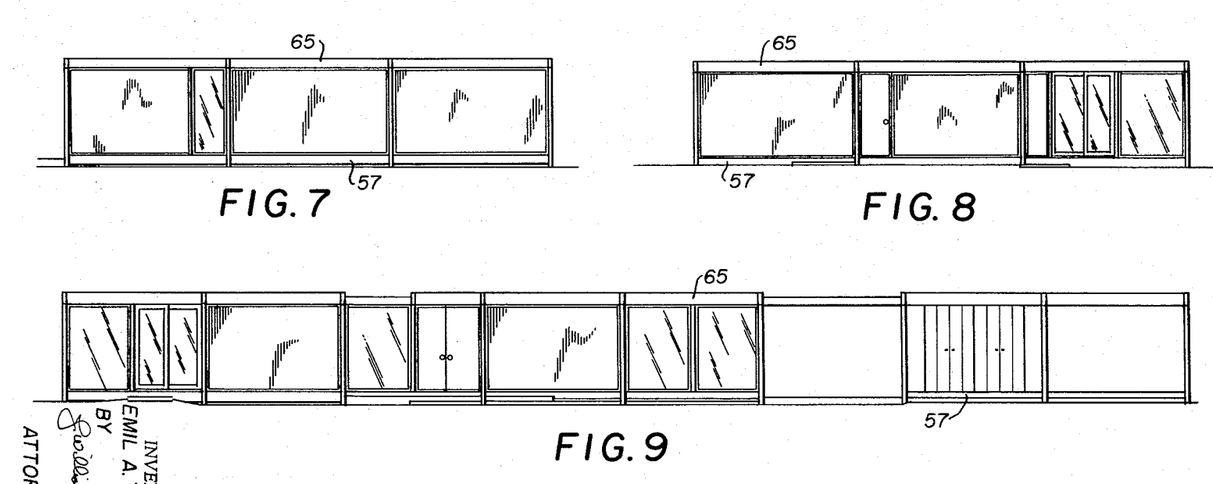

Referring now to FIGURES 4 and 5 for a detailed evaluation of the manner in which the exterior panels are connected with the supporting framework, it will first be noted that the bottom edge of the panel 26 is secured with respect to the lower beam 57 by the use of opposed elongate securing strips 58 and 59 with both of these securing strips being of sufficient length to cover the entire joint between panel 26 and the floor perimeter beam 57. The securing members 58 and 59 are shown as having projecting bosses 58a and 59a that are capable of being disposed in opposed relationship to each other so that a bolt 60 may be received in connecting relationship with the securing means 58 and 59 as shown in FIGURE 4. Rubberlike insulating strips 61, 61 are carried by each said securing member for the purpose of obviating metal to metal contact with the strips 61, 61 serving as a vapor barrier at the point of connection between the panel and the beams.

A similar set of securing means 58 and 59 is shown securing the top edge of the panel 26 with respect to the ceiling beam 65 and in this regard, it is to be understood that the framework of the glass panel units employed is designed for similar coaction with the securing strips 58 and 59. In this fashion, all panels, whether solid or glass, can be secured with respect to the structural framework by utilization of the securing strips of the type just described.

For the purpose of providing support for the floor components, the floor beam 57 is shown provided with an elongated angle iron 66 that is welded thereto, as at 67, so as to provide support for the edges of the floor panels that will be provided. In this regard, it is preferred to use prefabricated panels as floor components, and the preferred arrangement envisions the use of floor panels having a nominal dimension of 12′0″ so as to span the distance between the columns A1 and A2 for example.

A typical panel unit 70 is shown in FIGURES 4 and 5 as including top and bottom plywood skins 71 and 72 that are secured with respect to a perimeter frame 73 with the cavity so defined being filled with insulating material 74 so as to provide an insulation characteristic to the panel.

While the longitudinal dimension of the panels has been illustrated as being 12′0″, it is to be understood that this dimension is nominal since as is shown in detail in FIGURE 4, some clearance must be provided between the edge of the panel and the beam 57 for the purpose of seating the securing means 59 and avoiding the weld 67.

For the purpose of providing support for the roof components, the upper beam 65 is shown including an elongate angle iron 78 that is welded to beam 65 so as to support thereon the longitudinal ends of roof panels 80, with the panels 80 preferably being dimensioned identically to the panels 70 so as to permit interchangeable use of these panels.

In FIGURES 4 and 5, ceiling tile 81 is shown provided on the underside of the panel 80 which again has been constructed with top and bottom plywood skins 82 and 83 that are connected to each other by perimeter frame 84. Preferably, both panels 70 and 80 have a nominal width dimension of approximately 3′6″ and as shown in FIGURE 4, the panel 80 has its edge seated on angle iron 78, with panel 80 having a cant strip 85 nailed thereto with roofing 86 being positioned over skin 82 and strip 85. A two piece facie unit, made up of a series of spaced pressure plates 88, 88 covered by an elongated detachable joint cover 89, completes the juncture of roof to wall shown in FIGURES 4 and 5.

Again referring to FIGURE 4, the floor beam 57 also includes an elongate angle iron 90 that depends from the bottom face of beam 57 for the purpose of supporting a decorative skirt board 91 that is fastened thereto by a plurality of bolts 92, 92, with this arrangement serving to close off the space between the bottom of the beam 57 and the ground. A termite shield 93 is shown conveniently supported at this point of connection as clearly shown in FIGURE 4.

The preferred form of the invention further contemplates the use of a spline type joint between the adjacent longitudinal edges of the panels 70 and 80 as shown in FIGURE 5, with the longitudinal edges of the top and bottom skins (82 and 83 in the case of panel 80, and 71 and 72 in the case of panel 70) overlapping the respective perimeter frame in question so as to permit attachment of a spline member 87 that permits these members to be tightly nailed together during installation.

In this regard, by use of a panel having a width of approximately 3′6″, it will be noted that the 14′0″ modular dimension will be spanned by the use of four panels.

While the exterior perimeter wall of the house is designed and supported with respect to the structure and framework as above described, it has been indicated that the interior of the house is divided into rooms by the use of component walls that are preferably uniform as to depth and height dimensions, with the width dimensions being carefully correlated with respect to the modular planar dimensions employed.

Accordingly, and referring again to FIGURE 3, it will be noted that the front and rear bedrooms are separated by four component walls 92, 93, 94 and 95 with the just described component walls each having a depth of 28 inches and further having a nominal height of 8′0″ so to preferably be in close adjacency with the ceiling tile when supported on the floor tile as shown in FIGURE 4, with the actual height dimension of such components being in the neighborhood of 7′11⅝″ so as to provide slight clearance for the purpose of installing these units that are shown in section in FIGURES 4 and 5 of the drawings. The just described components have width dimensions of exactly 56 inches so as to provide a door opening of 32 inches between the units 95 and 98. It will be noted, however, that the component walls 96 and 97 are 44 inches in width in each instance, while the component wall 98 is 28 inches square so as to provide a 116 inch dividing wall between the two rear most bedrooms shown in plan in FIGURE 3.

Description of the aforementioned component parts reveals the advantage of having the width dimensions of the component walls being selected from the group consisting of 28, 44, or 56 inches.

In addition to the preceding specifically described elements, the views of FIGURES 2 and 3 further schematically illustrate certain bathroom fixtures such as tub, closet and sink, as well as kitchen fixtures that include sink, range, refrigerator and oven. Utility fixtures such as furnace, and water heater are also similarly schematically illustrated.

Additionally, garage, patio and sunning areas are illustrated for the purpose of disclosing how a maximum amount of useable area can be achieved with minimal additional cost.

In use or operation of the improved modular concept, it is merely necessary that the component structural framework be assembled to right angle relationship indicated in FIGURES 1 and 2 with the floor and ceiling beams being arranged at right angles to each other and the vertical columns that support the same. Following this, the exterior panels of either solid or glass construction can be positioned in place by using the securing strips in the manner indicated. When the exterior perimeter is complete as just described, it is merely necessary that the ceiling and floor covering be applied whereupon the component walls can be positioned as shown in the plan view of FIGURE 3. Any interior walls will be positioned in like fashion.

The utilities including water, heat, light, etc., can then be installed with a minimal amount of difficulty and is preferred that the site be prepared in advance to expedite such installation.

It will be seen from the foregoing that erection of the completed house involves a matter of at most a few days time as contrasted with the normal construction period of several months. It has been further shown how use of the modular concept involved herein permits maximum flexibility of design while yet achieving ideal production conditions that require only a minimal number of correlated dimensions to attain such maximum flexibility.

The modular principle is illustrated in FIGURES 10 through 13 in connection with a multi-level house that has a foyer entrance approximately midway between the upper and lower levels so as to give the effect of split level housing in connection with conventional two story type of construction.

Accordingly, a total of twelve living modules and four garage modules are provided in the house of FIGURES 10 through 13.

Figure 10:
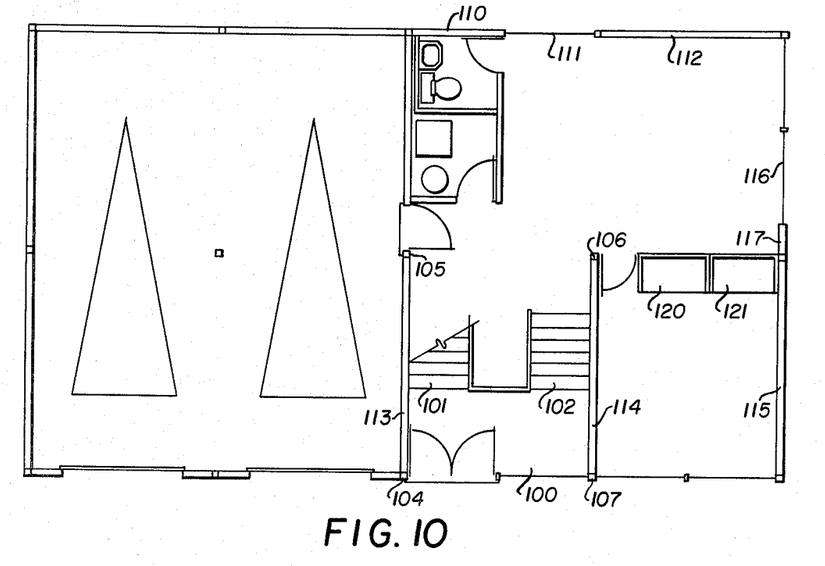
FIGURES 10 and 11 illustrate respectively the lower and upper floor plans of a house utilizing the modular principle in multi-story construction.
Figure 11:
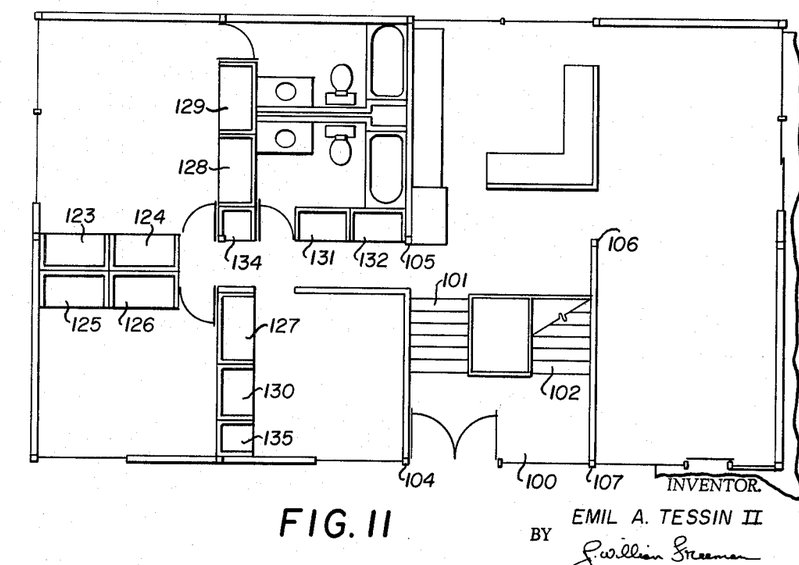
Figure 12:
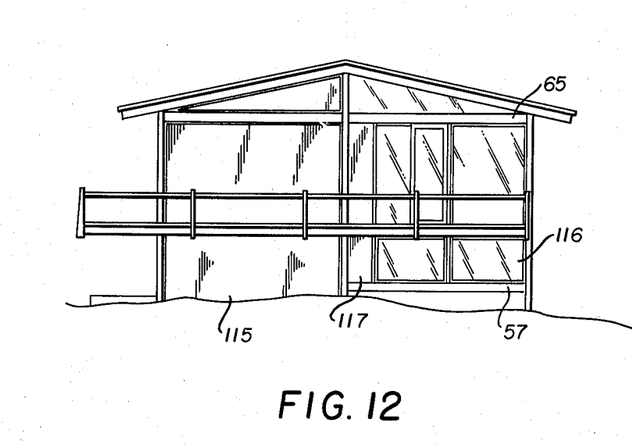
FIGURES 12 and 13 are side and front elevations respectively of the house shown in FIGURES 10 and 11.
Figure 13:
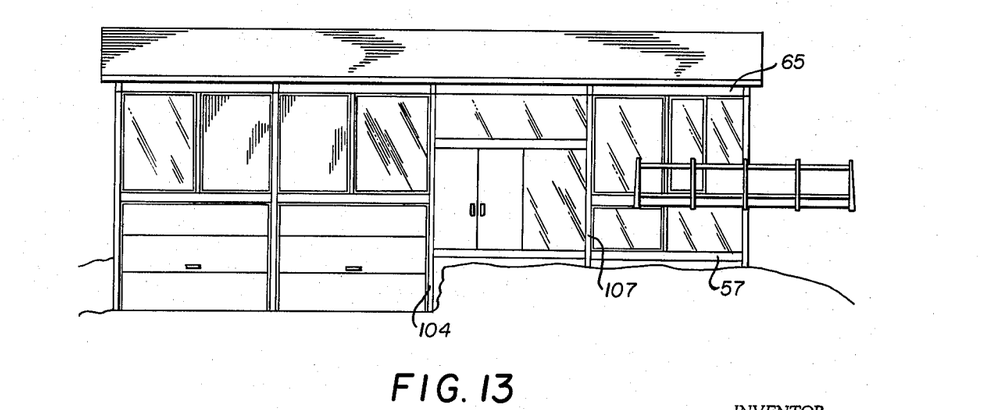

Accordingly and referring to FIGURES 10 and 11, the foyer level indicated by the numeral 100 is shown provided with stair wells 101 and 102, with the stair well 101 leading from the foyer level 100 to the upper level shown in FIGURE 11, while the stair well 102 leads to the lower level shown in plan in FIGURE 10. Thus, the columns 104, 105, 106 and 107 (FIGURES 10 and 11) enclose in reality two modules on top of each other throughout their height. However, and as shown in front elevation in FIGURE 13, by providing the foyer level 100 at a point midway between the lower and upper floors, such superimposed modules serve the purpose of creating a split level effect by virtue of the diversion of traffic either up or down as desired.

The exterior wall construction has been previously described in connection with FIGURES 1 through 9 and will not accordingly be reiterated with it sufficing to note that each level has a separate perimeter wall made up of solid or glass panels as shown in FIGURES 10 and 11. Thus, the rear portion of the lower living level is defined by a six foot width solid panel 110 in cooperation with a glass panel 111 of equal width, with the rear wall being completed by panel 112 which is 12'0" in width. Fourteen foot wide solid panels 113, 114 and 115 separate the foyer area from the study and garage areas, while the open end of the family room is closed off by a twelve foot glass panel 116 butted against a two foot solid panel 117.

The perimeter wall of the upper level is defined by a combination of solid and glass panels as is clearly shown in FIGURE 11 of the drawings, and accordingly repetitive numbering of these panels will not be undertaken since the width dimensions of the same are obvious from FIGURE 11 which is to scale with respect to FIGURE 10.

With reference to the component wall construction employed and referring to FIGURE 10, the component walls 120 and 121 have a width dimension of 56 inches so as to leave a door opening of 32 inches between the end of the unit 120 and the wall 114. In FIGURE 11, the component wall units 123, 124, 125, 126, 127, 128 and 129 all have width dimensions of 56 inches, while component wall units 130, 131 and 132 have widths of 44 inches. Units 134 and 135 have planar dimensions of 28 inches in width and depth with all other components previously described similarly having a 28 inch depth dimension.

With regard to the component walls just described, it should be noted that the same include closet units, dresser units and drawer units of various types so as to permit combination into the form shown in plan in FIGURES 10 and 11.

The modular house shown in FIGURES 14 through 18 of the drawings has a living area that is defined by eight modules arranged on the same level, with a pitched roof being provided for the purpose of illustrating the fact that the modular concept can be used regardless of the type of roof employed. Accordingly, in FIGURE 14 an internal wall 140 of 14 foot width serves to provide a division between the living room and the bedroom areas. A solid panel wall 141, of 12 foot width, divides the kitchen and foyer areas while the bathroom area is divided by a plumbing wall 142 and an interior walls 143 and 144.

Figure 14:
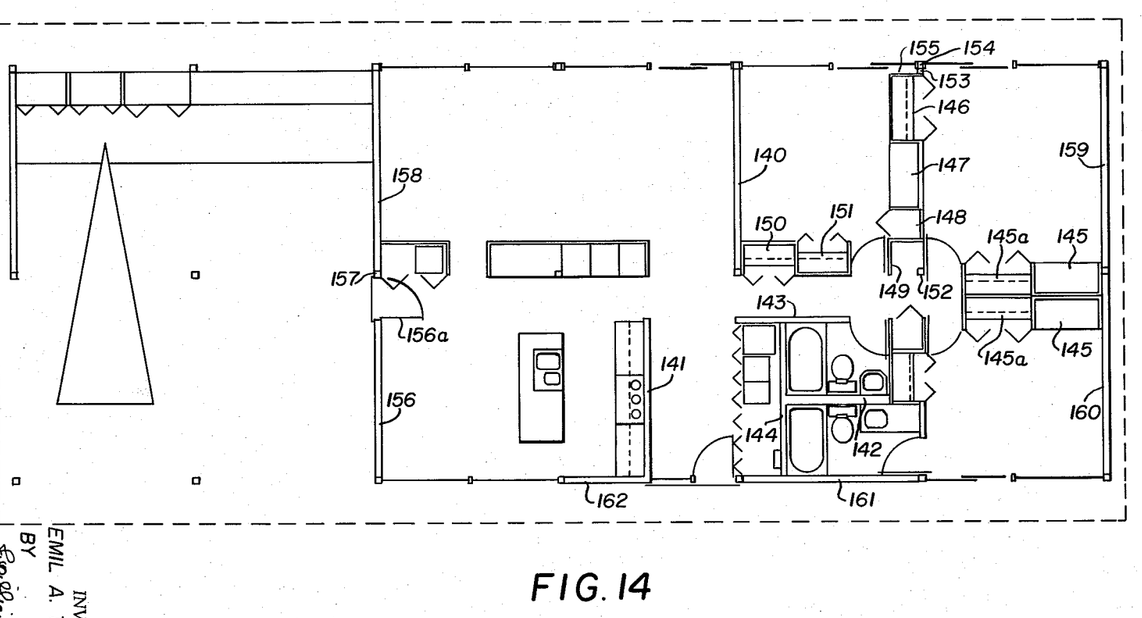
FIGURE 14 is a floor plan of a home utilizing the modular concepts of this invention but having a pitched roof.
Figure 15:
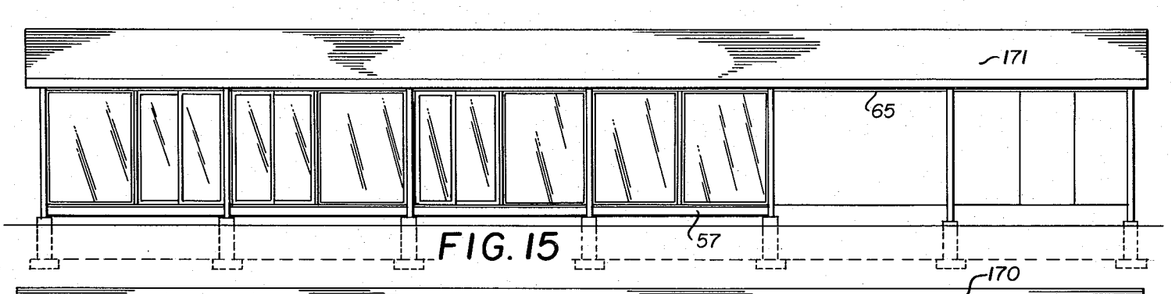
FIGURES 15 through 18 inclusive are elevational views of the house shown in plan in FIGURE 14.
Figure 16:
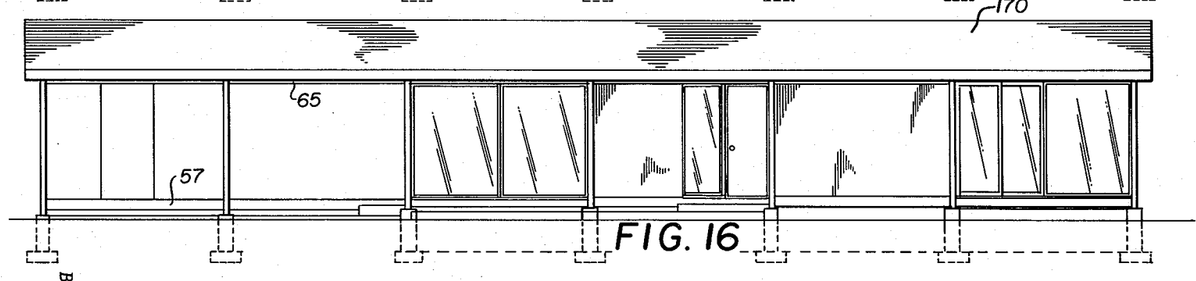

The remainder of the house is divided into subareas by the use of component walls with dressing units 145, 145 and closet units 145a, 145a being arranged in back to back, side to side relationship as shown in FIGURE 14 to divide the two right hand bedrooms from each other, with each of the just described units having a width dimension of 56 inches so as to leave a door space of exactly 2'8" for access into these bedrooms. A closet 146 and a dressing unit 147 coact together with closets 148 and 149 to divide the two rear bedrooms from each other with these bedrooms being further divided from the hall by closet units 150 and 151. Again and as noted, dimensional stability is achieved by making units 146 and 147, 56 inches in frontal width, while the units 148 and 149 are of 28 inches frontal width. Units 150 and 151 are shown having a width dimension of 44 inches.

The floor plan herein shown illustrates how the component wall construction above described can be utilized to provide a pocket area for drapes if desired. Specifically, the unit 149 is provided with a four inch cutout so as to enable the frontal portion thereof to fit around the column 152. A filler strip 153 is provided adjacent the column 154 and in this fashion drapes may be recessed within the area indicated by the numeral 155 in FIGURE 14 of the drawings.

Again the exterior panels employed to enclose the remainder of the house shown in FIGURES 14 through 18 have widths of either 6 feet, twelve feet, or fourteen feet, with the fourteen foot wall 156 being made up to include a door opening 156a adjacent column 157. Panels 158, 159 and 160 are of 14 foot width, with panel 161 being twelve foot width while panel 162 is of six foot width. The glass panels provided on the front and rear of the house are of 12 foot width being either fixed or incorporating a sliding door as is shown in the drawings with the fixed portion and slidable sections in each case, being shown to be of six foot width.

Figure 17:
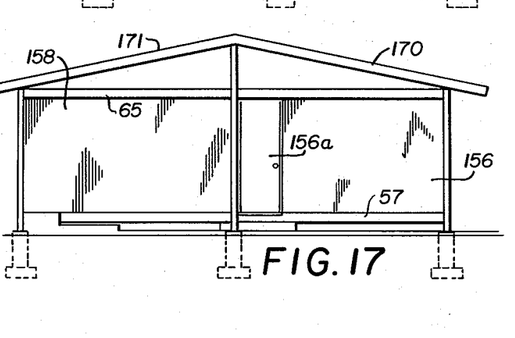
Figure 18:
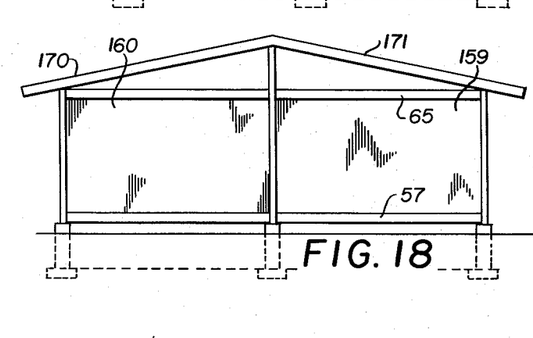

The elevational views further show how the roof portion of the house is made up of a sloping frontal roof section 170 and a complementally sloping rearward roof portion 171 that form a roof that overhangs the front and rear walls as illustrated in the elevational views of FIGURES 17 and 18.

In FIGURES 19 through 22 inclusive, the modular principle of this invention is shown utilized in connection with the production of a split-level home having a main living level from which the occupant may either walk up to an upper level or down to a lower level.

Figure 19:
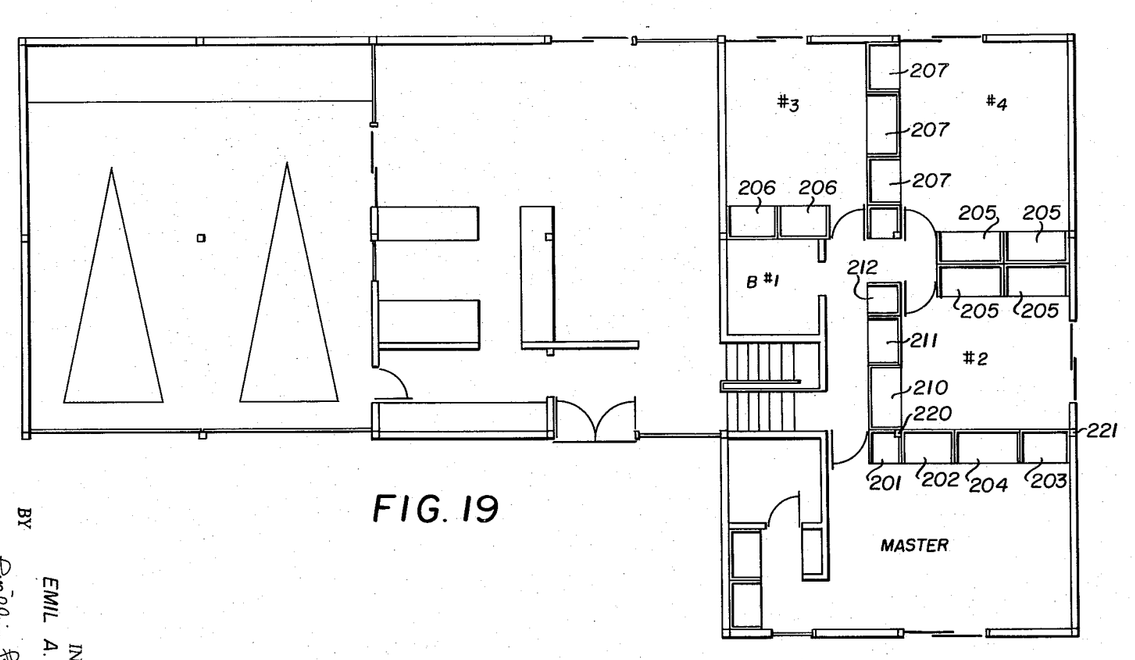
FIGURES 19 and 20 are floor plans of a split level home employing the modular principle of this invention.
Figure 22:
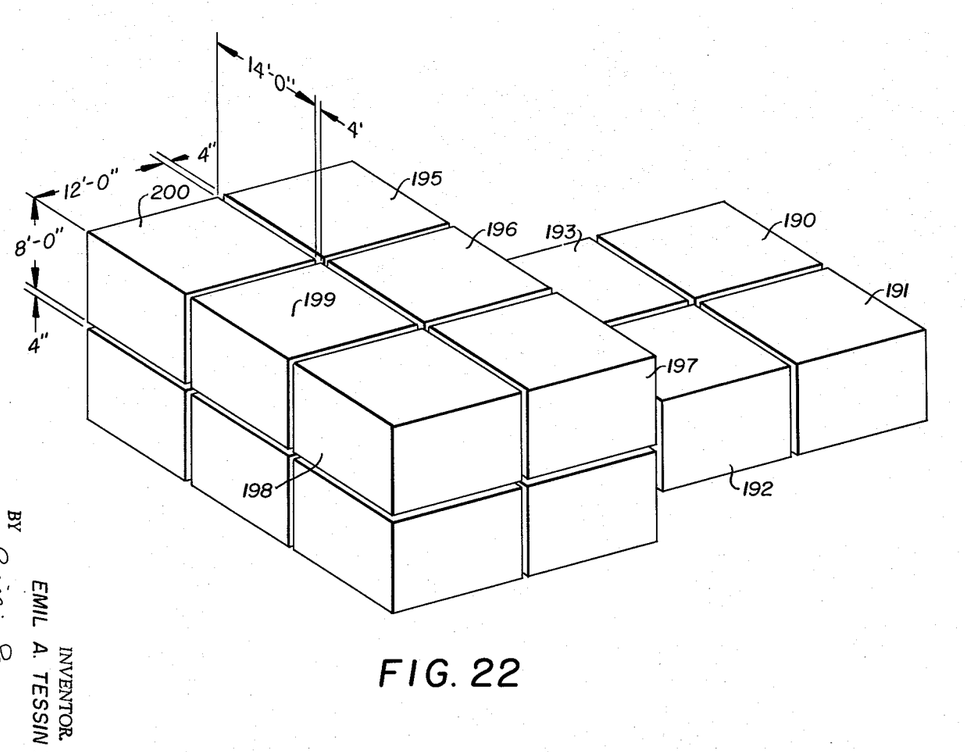
FIGURE 22 is a schematically presented perspective view illustrating the arrangement of the modular components employed in the house shown in FIGURES 19 through 21 inclusive.

In this regard, and referring to the schematic view of FIGURE 22, the living level is made up of four modules 190, 191, 192 and 193, with these modules defining a living, dining, kitchen and entry area as shown in FIGURE 19. The upper or bedroom level shown in FIGURE 19 is made up, as schematically shown in FIGURE 22, of modules 195, 196, 197, 198, 199 and 200 with these modules defining four bedrooms and two baths and further providing a portion of the stair well that connects the living level with the upper level just described.

Referring to FIGURE 19, it will be noted with respect to this upper level that linen chest 201, dressing tables 202 and 203 and closet 204 serve to divide the master bedroom from bedroom No. 2, while closets 205, 205 serve as a dividing wall between the bedrooms No. 2 and No. 4. Similar division of bedroom No. 3 with respect to the bath No. 1 and bedroom No. 4 is shown effectuated by closets 206, 206 and chests 207, 207.

Figure 20:
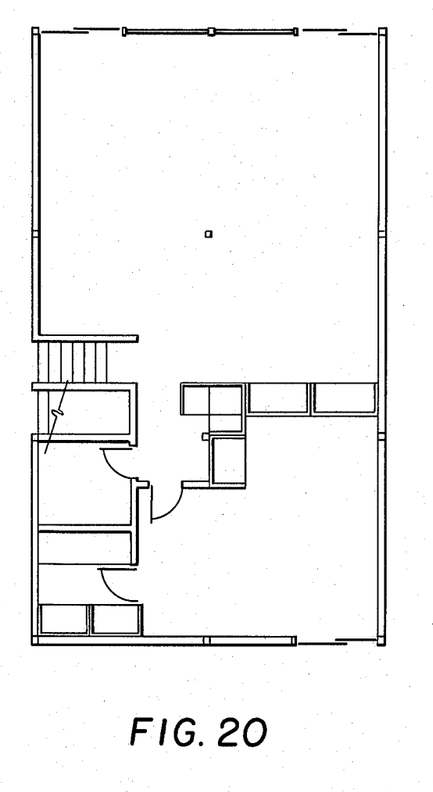

Referring again to FIGURE 22, it will be seen that an equal number of modules are underlying the modules 195 through 200 in aligned relationship therewith so that six modules of space are also provided in the lower level as shown in FIGURE 20, with the division of space by the component walls being apparent from the plan view of FIGURE 20.

Figure 21:
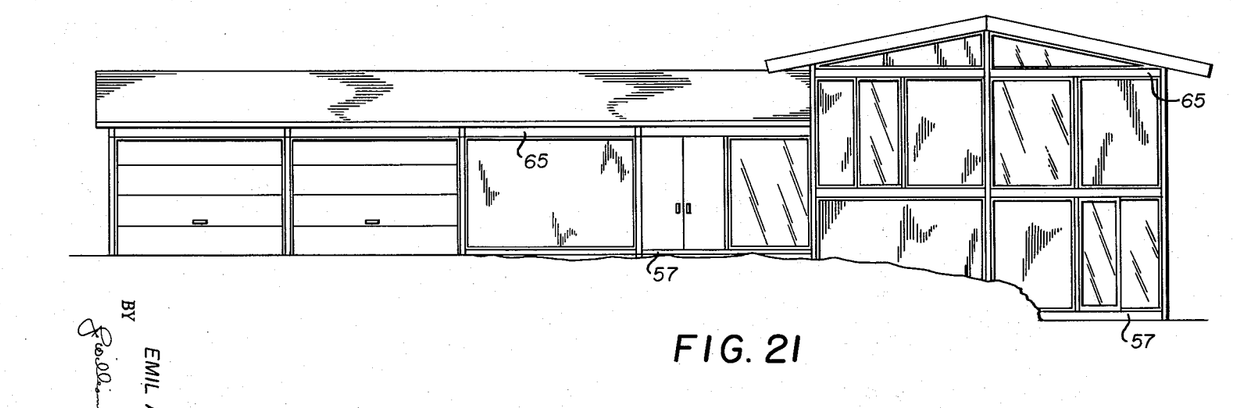
FIGURE 21 is a front elevational view of the house shown in plan in FIGURES 19 and 20.

FIGURES 19 and 21 also show how the area enclosed can be readily expanded by the utilization of four additional modules for a garage area, with this arrangement being optional to the owner.

The correlation of component wall dimensions to modular dimension is again illustrated clearly in connection with the house of FIGURES 19 through 22 inclusive.

Specifically, it will be noted how the components 201, 202, 203, and 204 have been positioned in side by side relationship to form a dividing wall that leaves the requisite opening for entry into the master bedroom with the unit 201 having a width and depth dimension of 28 inches, while chests 202 and 203 have frontal widths of 44 inches, and closet 204 has a frontal width dimension of 56 inches.

In this regard, it will be noted that the sum of the frontal dimensions of the units 202, 203, 204 (44+44+56) equal exactly 144 inches which is the module dimension between the vertical columns 220 and 221 shown in this region.

Also in this regard, the chest 210, closet 211 and linen closet 212 have a combined width of 128 inches (28+44+56=128) so as to leave a 40 inch opening adjacent column 223 for entry into bedrooms No. 2 and No. 4.

In connection with FIGURES 19 through 22, the various component walls are scaled with respect to each other to show the dimensional correlation of component wall to building module. This use of scale has been employed throughout this application with the result that there is a definite scale correlation between component wall and module dimension in all cases.

It will be seen from the foregoing how there has been provided a new and novel concept of a prefabricated housing that utilizes a modular dimension that permits the attainment of a maximum flexibility in design of living areas under advantageous production conditions wherein a minimum number of unit sizes are employed.

It has been further shown how the use of a structural framework to space the modules from each other by a dimension equivalent to the wall thickness employed, serves to provide discipline of the dimensions employed so as to attain maximum flexibility in room arrangement while still only requiring a minimal number of panel and/or component widths to achieve such flexibility under production conditions.

It still has been further shown how the use of component walls for the purpose of dividing the living space into room areas serves to perform the dual function of separating the rooms while simultaneously providing storage and/or other useable space in the appropriate location required.

In this regard, it has been further shown how the establishment of a dimensional correlation between the module dimensions and the component wall dimensions serves to again increase maximum flexibility of design with respect to said dividing walls by permitting the maximum number of component combinations to be utilized with a minimum number of component widths being involved for production purposes.

Further, it has been shown how the use of a spacing arrangement of preferably four inches between the adjacent modules serves to permit the modules to define greater overall living area than would otherwise be the case if the modules were arranged in abutting relationship.

It has further been shown how the use of the modular principle above broadly described, further has the desirable advantage of producing a house that has extreme compatibility for reception of predimensioned utility packages such as bathroom packages, kitchen packages, heating and cooling packages and electrical packages.

It has also been shown how the modular principle above described is not limited in use or to any one type of floor plan, but that the same is readily adaptable to multi-level, split-level, and single level plans, with the modular principle providing no limitation of any kind on the design requirements of the architect, owner or builder.

While the preferred form of the invention has been illustrated by the use of a modular home made with aluminum and glass exterior panels intermixed as required, it is to be understood that the concept herein disclosed could be utilized with equal advantage with other materials and with fastening and connecting means of types other than those herein disclosed.

Accordingly, modifications of the invention may be resorted to without departing from the spirit hereof or the scope of the appended claims.

What is claimed is:
1. A modular house of the character described, comprising;
 (A) a plurality of elongate frame members of quadrilateral cross section and each including:
  (1) a first pair of opposed faces adapted to define openings between adjacent frame members,
  (2) a second pair of opposed faces respectively defining interior and exterior wall surfaces;
 (B) first connecting means connecting the ends of said frame members into a rigid framework wherein said framework forms
  (1) first sidewall openings of equal depth and planar dimension,
  (2) second sidewall openings of equal depth and planar dimension,
  (3) roof openings of equal depth and planar dimension,
  (4) floor openings of equal depth and planar dimension;
 (C) a plurality of sidewall, roof and floor panel units respectively corresponding in number and further repsectively corresponding nominally in depth and planar dimension to the depth and planar dimension of said respective openings, whereby said panel units are inserted in said openings and substantially fill the same with said insertion being done during the period said frame members are connected into a rigid framework by said first connecting means,
  (1) the edges of said panel units being parallel to and closely adjacent to said first pair of opposed faces of said surrounding frame members,
  (2) the opposed faces of said panels being substantially coplanar with said second pair of opposed faces of said surrounding frame members; and
 (D) second connecting means
  (1) secured in place after insertion of said panels into said openings,
  (2) and having support faces engaging opposed coplanar faces of said frame members and said panel units at their point of juncture following insertion of said panels into said openings, whereby said panels are maintained in said aligned relationship within said openings to form an enclosure.

2. The device of claim 1 further characterized by the fact that at least one of said second connecting means includes sealing means adapted to seal off the space between said panel edges and said surrounding frame members.

3. The device of claim 1 further characterized by the fact that said sidewall openings have a depth dimension of four inches.

4. The device of claim 1 further characterized by the fact that at least one of said sidewall openings has a planar dimension of 8′0″ x 12′0″.

5. The device of claim 1 further characterized by the fact that at least one of said sidewall openings has a planar dimension of 8′0″ x 14′0″.

6. The device of claim 1 further characterized by the fact that said floor and ceiling openings have planar dimensions of 12′0″ x 14′0″.

7. The device of claim 1 further characterized by the fact that each said floor panel units includes four panel members having planar dimensions of 12′0″ x 3′6″.

8. The device of claim 1 further characterized by the fact that at least one said sidewall panel unit includes adjacent solid and glass panels of equal height.

9. A modular house of the character described, comprising;
 (A) a plurality of elongate frame members of quadrilateral cross section and each including;
  (1) a first pair of opposed faces adapted to define openings between adjacent frame members,
  (2) a second pair of opposed faces respectively defining interior and exterior wall surfaces;
 (B) first connecting means connecting the ends of said frame members into a rigid framework wherein said framework forms
  (1) first sidewall openings of equal depth and planar dimension,
  (2) second sidewall openings of equal depth and planar dimension,
  (3) roof openings of equal depth and planar dimension,
  (4) floor openings of equal depth and planar dimension;
 (C) a plurality of sidewall, roof and floor panel units respectively corresponding in number and further respectively corresponding nominally in depth and planar dimension to the depth and planar dimension of said respective openings, whereby said panel units are inserted in said openings and substantially fill the same with said insertion being done during the period said frame members are connected into a rigid framework by said first connecting means,
- (1) the edges of said panel units being parallel to and closely adjacent to said first pair of opposed faces of said surrounding frame members,
- (2) the opposed faces of said panels being substantially coplanar with said second pair of opposed faces of said surrounding frame members; and (D) second connecting means
- (1) secured in place after insertion of said panels into said openings,
- (2) and having support faces engaging opposed coplanar faces of said frame members and said panel units at their point of juncture following insertion of said panels into said openings, whereby said panels are maintained in said aligned relationship within said openings to form an enclosure;

(E) a plurality of freestanding divider components
- (1) supported on said floor panel units and having a nominal height equal to the height of said wall panel units, whereby said divider components divide said enclosed area into sub-areas.

References Cited by the Examiner

UNITED STATES PATENTS

| | | | |
|---|---|---|---|
| 1,362,069 | 12/1920 | Witzel | 20—2 X |
| 1,878,367 | 9/1932 | Bemis | 189—1 |
| 2,070,937 | 2/1937 | Vallet | 189—1 |
| 2,117,934 | 5/1938 | Bemis | 20—2 |
| 2,177,699 | 10/1939 | Fisher | 189—1 |
| 2,187,148 | 1/1940 | Fisher | 20—2 X |
| 2,667,241 | 1/1954 | Shannon | 189—1 |
| 2,850,771 | 9/1958 | Wagner | 20—92 X |
| 3,082,849 | 3/1963 | Keller | 189—36 X |

FOREIGN PATENTS 572,894   2/1958   Italy.

OTHER REFERENCES

Architectural Forum Publication, June 1944, pp. 91–95.

FRANK L. ABBOTT, *Primary Examiner.*

WILLIAM I. MUSHAKE, JACOB L. NACKENOFF,
*Examiners.*